US007865171B2

(12) United States Patent  
Karlsson

(10) Patent No.: US 7,865,171 B2  
(45) Date of Patent: Jan. 4, 2011

(54) METHOD AND SYSTEM FOR RATING NOTIFICATION

(75) Inventor: Stefan Karlsson, Karlskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 778 days.

(21) Appl. No.: 10/596,749

(22) PCT Filed: Dec. 23, 2003

(86) PCT No.: PCT/SE03/02084

§ 371 (c)(1),
(2), (4) Date: Sep. 17, 2007

(87) PCT Pub. No.: WO2005/062598

PCT Pub. Date: Jul. 7, 2005

(65) Prior Publication Data

US 2008/0188199 A1    Aug. 7, 2008

(51) Int. Cl.
*H04M 11/00* (2006.01)

(52) U.S. Cl. .................. 455/408; 455/406; 455/407

(58) Field of Classification Search .............. 455/406, 455/407, 408
See application file for complete search history.

(56) References Cited

U.S. PATENT DOCUMENTS

| 5,943,657 | A | 8/1999 | Freestone |
| 6,347,224 | B1 | 2/2002 | Smyth |
| 6,542,588 | B1 | 4/2003 | Mashinsky |
| 6,553,217 | B1 * | 4/2003 | Kundorf ............... 455/406 |
| 6,577,717 | B1 | 6/2003 | Henon |
| 2003/0074286 | A1 * | 4/2003 | Rodrigo .................. 705/32 |
| 2005/0009500 | A1 * | 1/2005 | Ear ........................ 455/408 |
| 2006/0003736 | A1 * | 1/2006 | Chan et al. ............. 455/408 |

FOREIGN PATENT DOCUMENTS

WO    WO 03094494    11/2003

* cited by examiner

*Primary Examiner*—Barry W Taylor

(57) ABSTRACT

A method and system for generating rating notification to a user in a communications system, wherein a tariff structure is traversed, and during the traversing, one or more notification requests are detected for intermediate conditions. One or more notifications resulting from the one or more notification requests are sent to the user.

18 Claims, 5 Drawing Sheets

METHOD AND SYSTEM FOR RATING NOTIFICATION

FIELD OF THE INVENTION

The present invention relates to a charging system in a communications system, and more particularly to a method and system for rating notification, providing customizable and flexible notifications to a user in a communications system.

DESCRIPTION OF THE PRIOR ART

Charging for usage of mobile communications networks such as GSM or GPRS, public switched telecommunications networks (PSTN), ISDN, Internet etc. and their associated services are achieved by means of a payment options or mechanisms. Both postpaid and prepaid options are used. If using the postpaid option the service subscriber pays for a service after it has been used, for example once a month. With a prepaid payment option the service subscriber pays before the usage of the service.

Both these payment options could use real time charging, i.e. the charging process is done as a part of the rendering of the service to the user. The postpaid payment option also supports non real time charging, i.e. when the charging process is done while or after the service is rendered.

When a purchase has been done or after a chargeable event is performed it is important for the user to get the actual cost for the purchase or event, including any discounts and bonuses received as a receipt. From a market perspective discounts and bonus should not be handed out without telling the user.

Operators are generally demanding more flexibility in user communication to improve their relation with the user, which reflects that customer retention in mature markets, that have a high telephony penetration, is very important.

For a user it is important to get to know the cost of a purchase or chargeable event before the purchase is done in order to achieve spending control. The notification of the cost could both be done as part of an authorization request before a purchase or other chargeable event is agreed and accepted, or as an on-demand price enquiry.

Existing online charging protocols, such as Diameter Charging Control Application (CCA) as well as Parlay, support price enquiry. That is, the protocols provide for a client system to request the provision of price information from a charging server before purchase.

During a charging session at least one calculation run is done. That is, the process of determining a price, deciding a service quantity to receive for a monetary amount, deciding a refill amount at voucher analysis, promotion analysis and so forth. Such a calculation run will detect several conditions that will affect the result being calculated.

In existing charging systems a notification analysis is implemented at the end of the chargeable session determining which standard notification to be send.

A problem in prior art systems is that the user has limited means to control its usage of services, for example spending control as mentioned above.

Another problem is that the calculation run will detect several conditions that affect the result being calculated, but the route taken through the tariff structure might not be available for further analysis.

SUMMARY OF THE INVENTION

It is an object of the present invention to provide a method for rating notification, providing customizable and flexible notifications to a user of services in a communications system that overcomes the problem and disadvantages set forth above in connection with the prior art.

This object is achieved by a method for generating rating notification to a user of a requested service in a communications system, characterised in that a tariff structure is traversed and that during the traversing, one or more notification requests are detected for intermediate conditions that affect the result being calculated. One or more notifications resulting from the one or more notifications requests are sent to the user.

A more specific object of the invention is to provide a computer program for working the method.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION OF THE INVENTION

Figure 1:
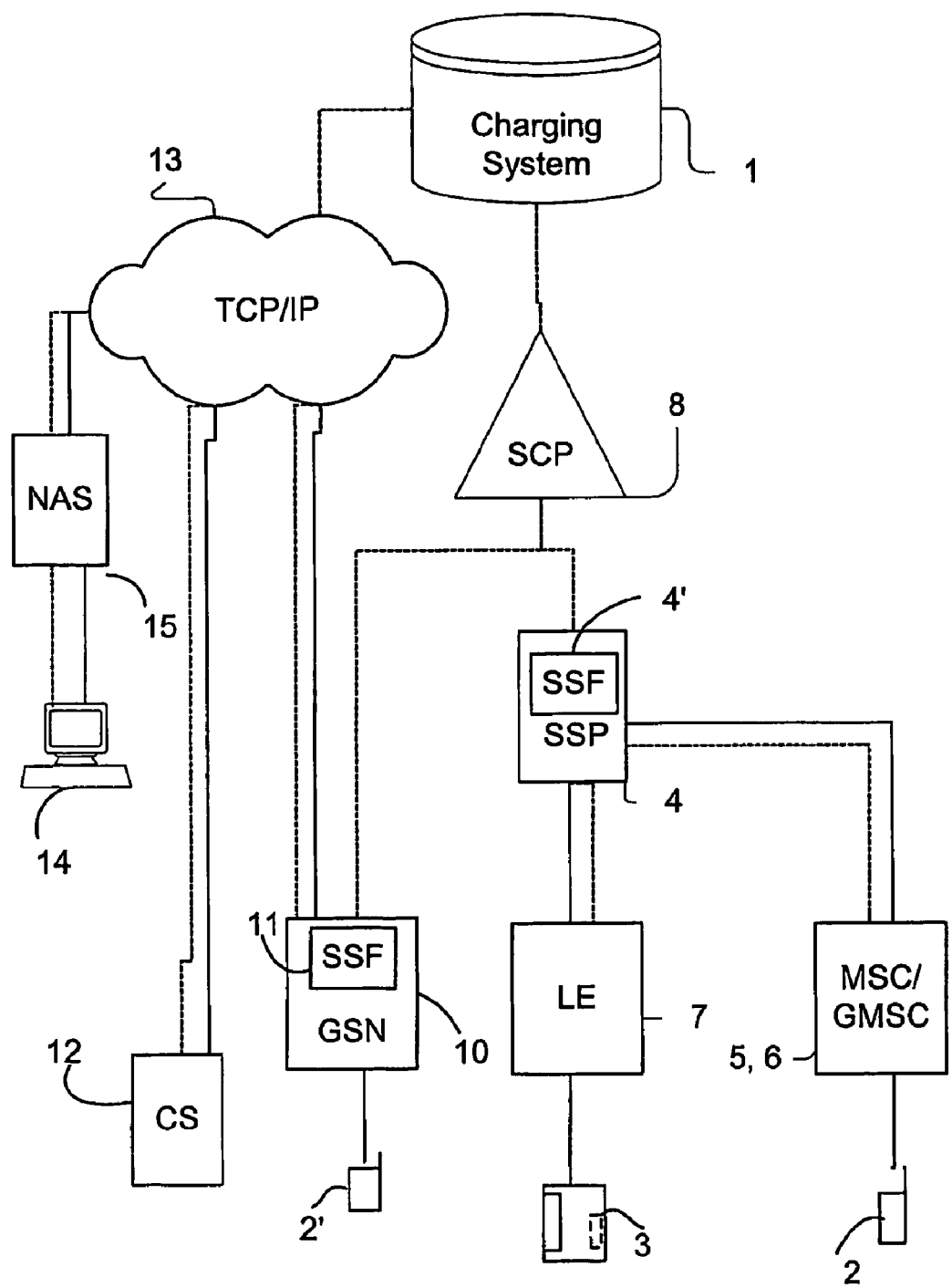
FIG. 1 is a schematic view of a first embodiment of a communications network including a central charging system according to the invention.

Referring to FIG. 1, there is shown an example of a communications network including a charging system 1 providing customizable and flexible notifications according to the invention, such as price enquiries, to a user of services provided by the system. The communications system is, but is not limited to, for example a cellular mobile telephone network or PLMN (public land mobile network) including a service providing network, such as an intelligent network (IN) facilitating service delivery for subscribers connected to the network. In this embodiment, the network also provides a pre-pay option and a method for determining rating data for pre-paid services for subscribers in the communications network. The pre-pay option is only one example of a method for charging for services in a communications network, but this mechanism is not necessary for the invention. A post-pay option or other method of charging is likewise possible within the scope of the invention.

A user may access the charging system 1 providing a central charging and rating function CCRF via a number of access methods which is further described with reference to FIG. 1. If the charging system 1 is accessed via a user terminal such as a portable radio communication equipment 2 or a fixed telephone 3, the invocation is performed by a service switching point (SSP) 4 and its service switching function 4' via an intermediate MSC/GMSC 5/6 for the portable radio communication equipment 2 and a local exchange (LE) 7 via the service control point SCP 8 for the fixed telephone 3.

The term portable radio communication equipment, which herein after is referred to as a mobile phone, includes all equipment such as pagers, communicators, i.e. electronic organizers, smartphones or the like.

The GMSC 5, i.e. gateway mobile services switching centre, or only MSC 6, i.e. mobile services switching centre, provides specific data about individual mobile phones 2 in the network and operates as an interface towards other networks such as other PLMNs, ISDN or a public switched network (PSTN) in the communications system.

If the charging system is invoked due to usage via a mobile phone 2' with GPRS capabilities, a GSN 10 will directly invoke the charging system 1 by its co-located service switching function (SSF) 11 via the SCP 8. If invoked due to usage of a service at a content server (CS) 12 connected to the Internet 13 accessed from a data terminal 14 through a network access server (NAS) 15, the content server (CS) 12 can directly access the charging system 1 via a TCP/IP network, such as the Internet 13. Access to an application server via a mobile phone will operate in the same way as when accessing from the data terminal 14, wherein the GSN 10 is operating as the NAS 15.

The charging system according to the invention includes system components involved in providing customizable and flexible notifications, such as responses to price enquiries, to a user of services provided by the communications system. The system provides means for collecting information about events that happen during a calculation run such as rating of reservation, rating of deduction, rating at price inquiry or rating at refill in order to notify the user about prices, bonuses and discounts, and refill amounts in real time or near real time.

Notifications to be sent to users need not only depend on the resulting calculated price. Therefore the content of a notification is built based on the different conditions leading to the final cost, but also other parameters as context of the notification, e.g. enquiry, purchase etc.

These conditions could for example be a promotion level achieved, a bonus level achieved, a deducted amount enough for a discount, a refilled amount that qualifies for a higher service class or discounts. These conditions could also result in actions that would be useful to notify the user about in order to boost traffic e.g. "you got 3 SMS for free by have been calling for 3 minutes, and you will receive 3 new SMS if you continue for another 3 minutes" and "when you reach 10000 points you will receive free access to the beta game site".

A mechanism is provided that decides which events detected during the calculation should produce immediate notifications and that have been encountered during a reservation calculation, deduction calculation or price calculation and that transfer events from the calculator to the function issuing the notification.

It is important for a user to get to know the cost of a purchase or chargeable event before the purchase is done in order to achieve spending control. The notification of the cost could both be done as part of an authorization request before a purchase is agreed and accepted or as an on-demand price enquiry.

Figure 2:
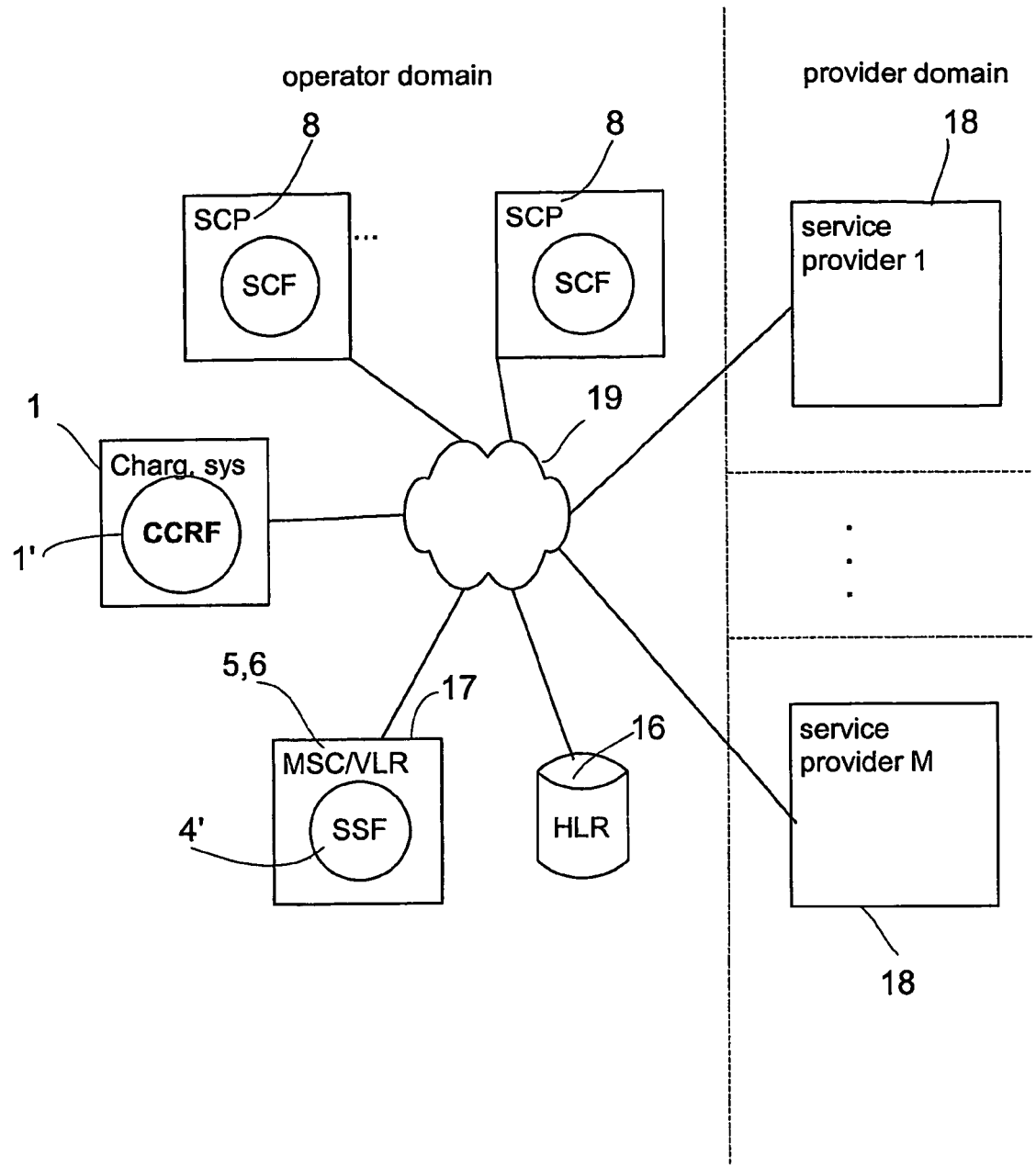
FIG. 2 is a schematic view of a part of a second embodiment of a communications network including a central and distributed charging system according to the invention.

FIG. 2 illustrates a communications system with a number of providers. The SCP 8 is a real-time database and service processing system that, based on a query from the SSF 4', performs subscriber- or application-specific service logic, controlling the call set-up and call flow. A home location register (HLR) 16 stores the identity and user data of all the subscribers belonging to the PLMN. Further, the HLR 16 provides the GMSC/MSC 5/6 with the necessary subscriber data when a call is coming from a public switched network (PSTN), an ISDN network, the Internet etc. A visitors location register (VLR) 17 contains relevant data of all mobile phones currently located or roaming within a serving GMSC/MSC 5/6. The VLR 17 has to support the GMSC/MSC 5/6 during call establishment when a call is initiated from a mobile telephone. The Charging System contains a database containing service data needed for the service, including for example tariff data, subscriber data, group data etc. In this embodiment, rating and charging analysis is handled in the charging system 1, SCP 8 and/or one or several providers 18. The system is an Internet protocol based protocol and/or a common channel signalling system 19.

In an alternative embodiment the providers 18 have a distributed rating function with integrity for providers with respect to rating data, plans, algorithms or schemas in relation to an operator in the communications network. The providers could be geographically separated from the operator. The operator and the provider(s) respectively control its own domain, which could be located in the same or different countries. Further, the operator and provider(s), respectively, owns, stores and controls its own data. Hence data controlled by the operator is protected from access by the providers and vice versa. As an example the user can be notified about the foundation, e.g. discounts, for the remote rating.

In the embodiments of the invention, the notification objects are parts of the tariff structure. Thus, the tariff structure has conditions leading to both a price, and/or to an object for notifications. Each notification object is tagged for either being sent directly to the user, or to be collected for subsequent processing, which is described later. When the rating structure has been traversed and the price is set, a post processing is done which builds a compound notification based on the notification objects that where collected.

Figure 3:
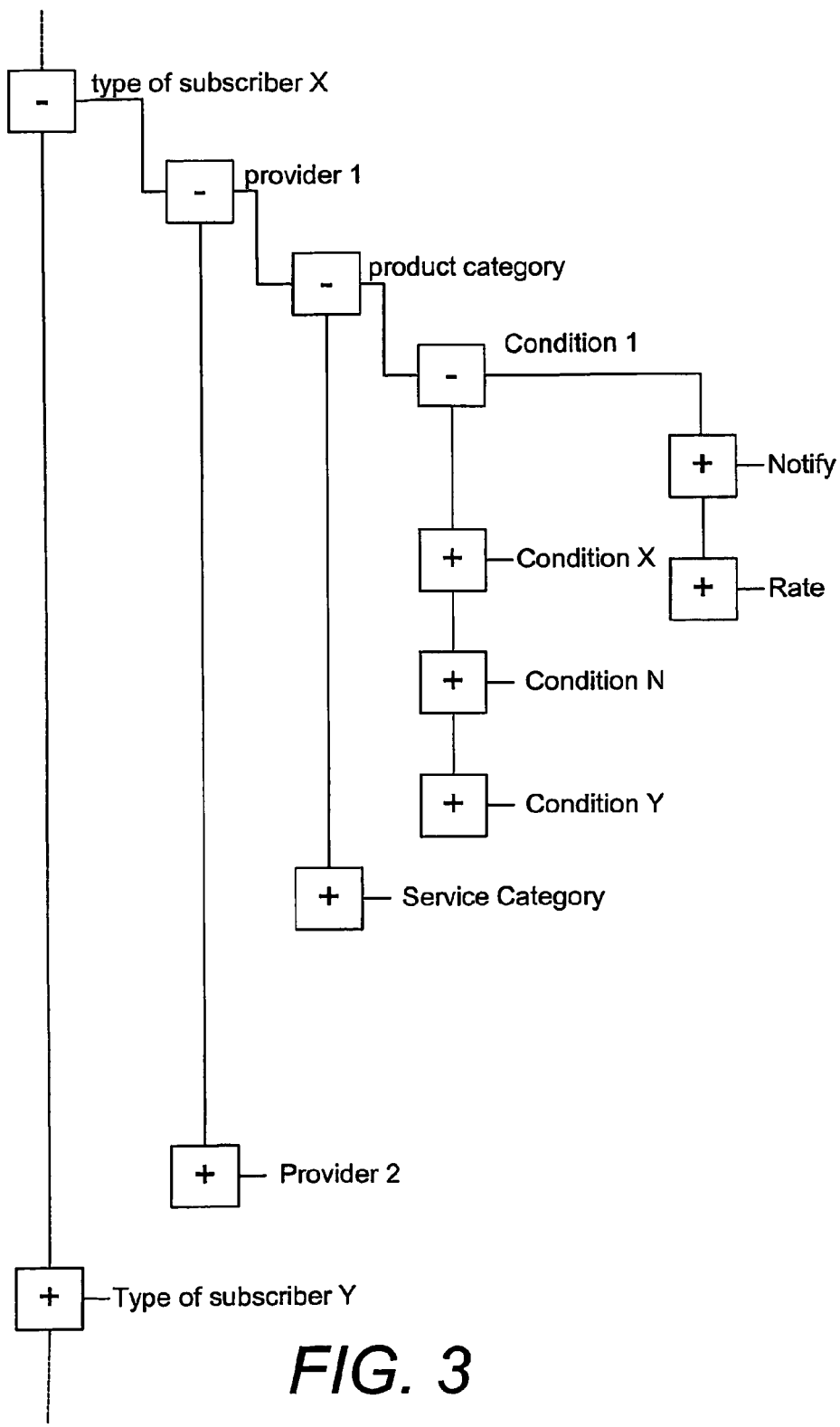
FIG. 3 shows a part of an analysis structure of a central charging function in the system of FIG. 1.

FIG. 3 is an example of a part of an analysis structure for rating, i.e. rating structure, explicitly invoking notifications. The data to be used in the notification could be stored in the notification object or being referred to. The condition, i.e. the node in the tariff structure, could be any one that is implemented for rating, promotion or accumulator such as time, day, location, type of call etc. To further differentiate additional conditions are provided such as:

Action equals: Enquiry, Purchase, Reservation, End of session control.

The notification request is entered into the structure as a leaf, possible together with a rate, fee or discount. If several nodes are allowed under the same condition as shown in FIG. 3, the notification request could be defined in a separate leaf from the event causing it.

During tariff structure, e.g. tariff tree, analysis several branches of the structure could be entered, i.e. several conditions are true and several leaves could thus be valid. This does also mean that several notification objects per analysis could be valid, e.g. bonus received, total cost etc.

Since the detection of one notification object could be done independently from other notifications, a final analysis of all notifications that was detected could be needed. In one embodiment of the invention this analysis is built with boolean conditions and IF statements in order to take decisions of the rating structure outcome. An example of this is that the reservation made emptied the account, wherein a pending notification is activated for this. Later in the analysis it is detected that the user comes up for a refund/bonus/discount and that money is to be returned covering the initial need/ request. A new notification will be pending for the refund/ bonus/discount and the final analysis would then remove the pending notification for an empty account.

In addition to request a notification, a rating leaf could also enter a suppression condition for a specific notification e.g. 'do not send any bonus notifications in this call' or allowance 'do send bonus notification at the end of the analysis'. This could be used if "compound" notifications are used instead of immediate individual event/condition notifications and may also be entered in the structure in order to prevent immediate notifications from a possible type of events, that could be detected later in the analyses e.g. "do no immediate notification on bonus" and "do no immediate notifications".

For correlation between several rating invocations each active/accepted/decided notification request could get a notification reference. A notification reference could be a dialogue or user interaction flow such as 'get PIN for purchase validation' for spending control at purchases or just 'get confirmation'. These references could be called upon as subroutines.

If this data is also entered as charging input in the new sessions, correlation could also be done between invocations during a chargeable session (call or active data session), preventing inconsistencies within a chargeable session.

Figure 4:
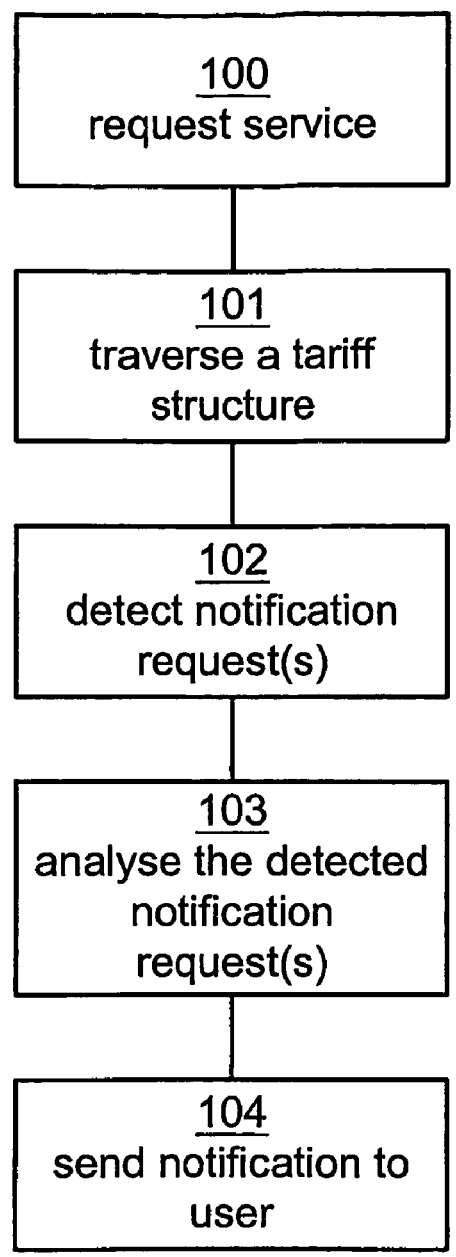
FIG. 4 is a flowchart of a first embodiment of the method according to the invention.

FIG. 4 is a flowchart of a first embodiment of a method according to the invention for rating notification, providing customizable and flexible notifications to a user in a communications system.

The charging and rating function starts in step 100 triggered by a request from a user via its mobile phone 2,2', fixed telephone 3, or data terminal 14 and proceeds to step 101 for traversing the tariff structure in FIG. 4, while calculating the cost of a purchase or a chargeable event. Hence, step 101 includes one or more sub-steps, all of which are not described herein in detail. The central charging and rating function CCRF collects or accesses charging input parameters or data such as: service data, subscriber related data, session data, call data, system data etc, received from an external service element of a service requested by a subscriber.

One example of a requested service is spending control for a regular phone call from a pre-pay subscriber in a PLMN. The subscriber has an account registered for one or more services at a service provider. The service element is for example an SSF via CAP or INAP, HLR via MAP, HSS (Home Subscriber Subsystem) and web servers/application servers via Diameter, SIP, open API via IP, i.e. OSA/Parlay, XML web-services via SOAP or any other server with an application requiring charging support, such as an e-commerce site movie/music server for streaming, a news site, WAP server or an SMSC/MMS-C. The charging input parameters includes for example an article identifier, number of events, kind of event, service, local time, destination number, originating or terminating location, distance, QoS, number of time slots, or utilised capacity etc.

A leaf with a notification request is detected in step 102. An analysis is performed in step 103 to determine if the notification should be sent directly to the user terminal 2, 2', 3, 14 for display or to collect it for post-analysis. If the notification is determined to be sent directly, it is issued to the requested terminal with the requested content in step 104. In an alternative embodiment, the notification could be sent to another destination than the terminal involved in the chargeable session.

Steps 101-104 are repeated until the tariff structure is traversed. If no collected notifications exist the method is ended and reset for another charging request.

Figure 5:
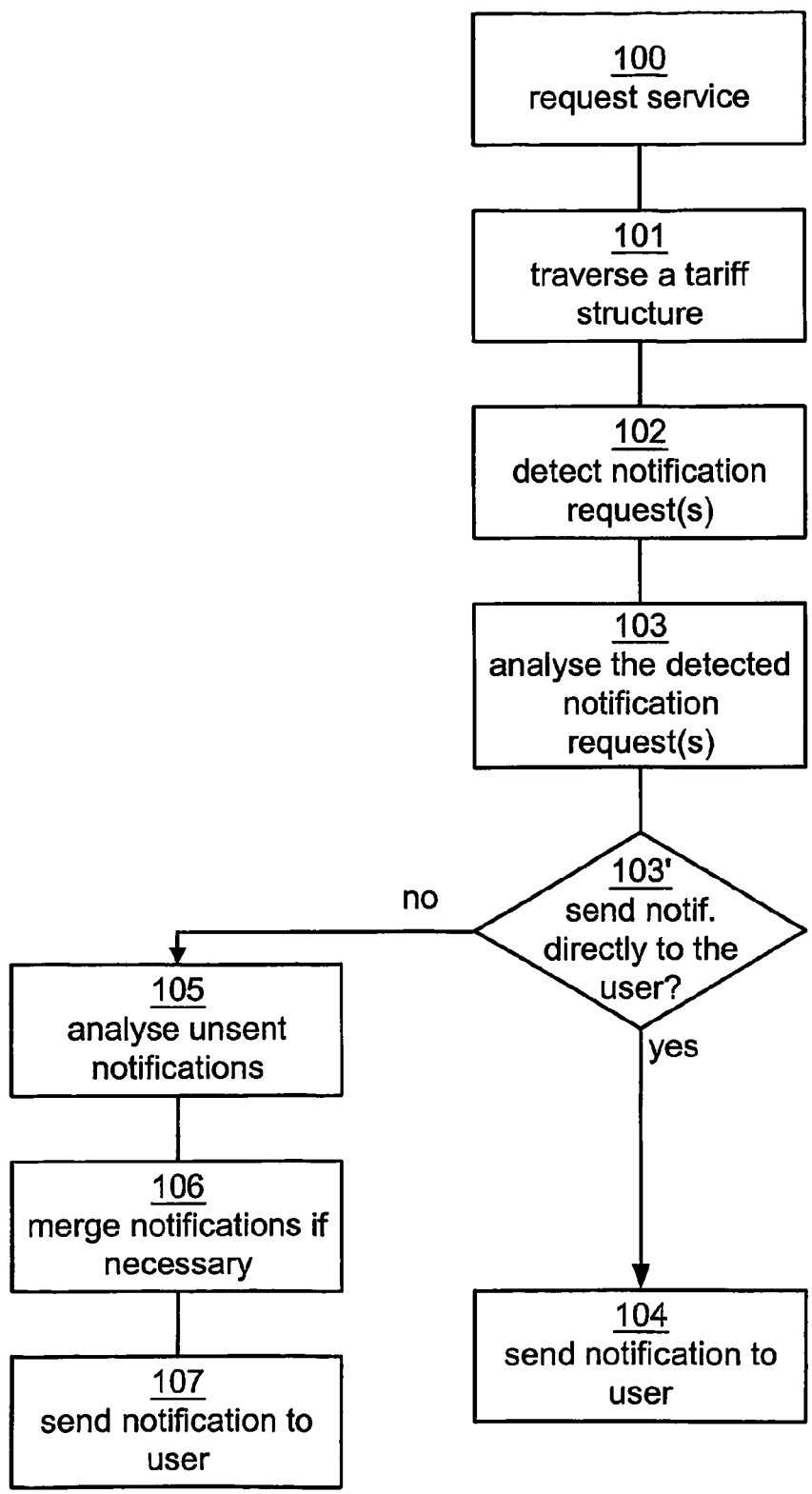
FIG. 5 is a flowchart of a second embodiment of the method according to the invention.

FIG. 5 is a flowchart of a second embodiment of a method according to the invention. If one or more notifications are collected for post-analysis, all unsent notifications are analysed in step 105 for determining which are to be sent. Messages may be merged if necessary in step 106. A rule engine can be used for determining how different notifications may affect each other. The message(s) is sent in step 107 and the method is ended and reset for another charging request.

This sequence can also be performed with a separate bonus analysis or at an accumulator selection analysis. The intention is however to have the whole analysis in one structure.

Hence, a possibility to invoke an internal or external notification or dialogue request from the rating analysis/process is provided. The analysis is run, on enquiry; before, during or after session/call/purchase; before, during, or after refill; etc.

One particular application of the notification function is for price enquiries but the invention is not limited thereto.

In one alternative embodiment no notification requests or triggers are defined in the tariff structure. Instead all conditions fulfilled during traversal are output as a log, which can be processed in a subsequent step by a separate process to analyse the performed rating and produce a corresponding notification.

In still another embodiment, every rating condition that is fulfilled (/not fulfilled) is signalled to an external notification process that can analyse the signal to determine how/if it should result in a notification. A condition may also incur the suppression of a not yet encountered immediate notification event.

The method of the present invention is preferably implemented in computer software executable preferably by a data processing system forming part of the overall communication system. In this embodiment of the invention, the computer processor of the operator in the network is configured to work the steps of the method.

Hence, it should be apparent that the present invention provides an improved method and system for use in an electronic communication network, comprising a rating and charging mechanism that provides for rating notification, providing customizable and flexible notifications to a user in a communications system that fully satisfies the aims and advantages set forth above.

Although the invention has been described in conjunction with specific embodiments thereof this invention is susceptible of embodiments in different forms, with the understanding that the present disclosure is to be considered as an exemplification of the principles of the invention and is not intended to limit the invention to the specific embodiment illustrated.

The invention makes it possible for a pre-pay (network) operator or post-pay (network) operator or any provider for service or content that is utilizing real-time rating to trigger notifications and dialogue requests depending on the events and conditions that are met during rating analysis and which affects the rating result. One or several notifications objects (triggered notifications) could be detected per rating analysis. The notification objects could be analysed immediately in the rating logic or outside of the rating function, where all events for one rating analysis could be collected for joint analyses in order to filter some out or all could be collected to end of session where it is analysed which ones or one to send.

The method of the present invention can also be implemented in computer software executable preferably by a distributed data processing system forming part of the overall communication system.

More specifically, the operator and the providers form separate data processing systems or are subsystems of the overall communication system for communication with other devices, components or data processing system(s) in the communication system of the network. The data processing system comprises separate computer processors for processing data in the operator and the respective provider domains, and at least one separate storage connected to each computer processor for storing data on a storage medium. In this embodiment of the invention, the computer processor of the operator in the network is configured to work the steps of the method performed in the operator domain. The computer processor of the provider in the network is configured to work the charging steps of the method performed in the provider domain.

In addition, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal.

Although the method is described in conjunction with a mobile telephone call in an intelligent/CAMEL network or Internet Protocol the method is applicable on any communication session. For example, the method and system according to the invention are applicable in other mobile telephone networks, public switched telecommunications networks (PSTN), ISDN, Internet, service networks etc., which provide many different more or less sophisticated tele and data communications services for users and providers.

The invention claimed is:

1. A method for generating rating notification to a user of a requested service in a communications system, comprising the steps of:
   traversing a tariff structure;
   during the traversing, detecting one or more notification requests for intermediate conditions; and
   after the step of detecting said one or more notification requests,
      analysing said detected one or more notification requests to determine if the notification should be sent directly to the user to be collected for post-analysis,
      if the notification is determined to be sent directly, sending said one or more notifications to the user,
      if the notification is determined to not be sent directly, storing said one or more notification requests for post analysis, and
      if one or more notifications are collected for post-analysis, analysing all unsent notifications for determining which are to be sent.

2. The method according to claim 1, comprising the step of merging one or more messages before they are sent to the user.

3. The method according to claim 2, wherein the merging is determined by a merging logic.

4. The method according to claim 1, wherein said analysis is run on enquiry; before, during or after session/call/purchase; or before, during, or after refill.

5. The method according to claim 1, wherein said one or more notification requests are for price enquiries.

6. The method according to claim 1, wherein all conditions fulfilled during traversal is output as a log, wherein said log is processed in a subsequent step by a separate process to analyse the performed rating and produce corresponding one or more notifications.

7. The method according to claim 1, wherein specific notification requests in the tariff structure triggers notifications that can either be issued in real-time or collected for further processing.

8. The method according to claim 1, wherein one or more condition that is fulfilled is sent to an external notification process for analysis.

9. The method according to claim 1, wherein a log of how the tariff structure has been traversed is created and processed after the analyses for generating a notification(s).

10. The method according to claim 1, wherein the conditions affect the result being determined.

11. The method according to claim 1, wherein the notification is sent to another destination than the terminal involved in the chargeable session.

12. A computer program embodied on a computer readable medium comprising program instructions for causing a computer to perform the method of claim 1, wherein the computer readable medium comprises a record medium, computer memory, or read-only memory.

13. A computer program embodied on a computer readable carrier and comprising computer executable instructions for causing a computer to perform the method according to claim 1, wherein the carrier comprises a record medium, computer memory, or read-only memory.

14. A system for generating rating notification(s) to a user in a communications system characterised by rating means including a computer apparatus adapted to perform the method of claim 1.

15. The system as in claim 14, wherein said system is operating in a mobile communications system.

16. The system as in claim 14, wherein said system is an Internet protocol based protocol or a common channel signalling system.

17. The system as in claim 14, wherein said service is a prepaid service.

18. The system as in claim 14, wherein said service is an electronic commerce/payment service.

* * * * *